United States Patent
Terashima et al.

(10) Patent No.: US 8,947,066 B2
(45) Date of Patent: Feb. 3, 2015

(54) CONTROL APPARATUS

(75) Inventors: Yoshiki Terashima, Kawasaki (JP); Tsubasa Yumura, Ome (JP); Kotaro Ise, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 354 days.

(21) Appl. No.: 13/428,335

(22) Filed: Mar. 23, 2012

(65) Prior Publication Data

US 2012/0242301 A1   Sep. 27, 2012

(30) Foreign Application Priority Data

Mar. 25, 2011   (JP) .................. 2011-068670

(51) Int. Cl.
*G05F 5/00* (2006.01)
*H02J 3/14* (2006.01)
*H02J 13/00* (2006.01)

(52) U.S. Cl.
CPC .............. *H02J 3/14* (2013.01); *H02J 13/0006* (2013.01); *Y02B 70/3266* (2013.01); *Y04S 20/242* (2013.01); *H02J 2003/143* (2013.01); *Y02B 70/3225* (2013.01); *Y04S 20/222* (2013.01)
USPC ........................................ 323/299

(58) Field of Classification Search
CPC .... H02J 3/14; H02J 13/2006; Y02B 70/3266; Y02S 20/242
USPC .............. 323/266, 268, 299; 713/300, 320; 324/140 R, 141
See application file for complete search history.

(56) References Cited

U.S. PATENT DOCUMENTS

| | | | |
|---|---|---|---|
| 8,181,047 B2 * | 5/2012 | Lee ............................... | 713/320 |
| 8,476,895 B2 * | 7/2013 | Higuma et al. ................ | 324/142 |
| 2012/0078427 A1 * | 3/2012 | Jang et al. ..................... | 700/291 |
| 2013/0339764 A1 * | 12/2013 | Lee et al. ...................... | 713/300 |

FOREIGN PATENT DOCUMENTS

| | | |
|---|---|---|
| JP | 2007-306738 A | 11/2007 |
| JP | 2008-104310 A | 5/2008 |
| JP | 2009-153336 A | 7/2009 |
| JP | 2010-166636 A | 7/2010 |
| WO | WO 2009/054023 A1 | 4/2009 |

OTHER PUBLICATIONS

Japanese First Office Action dated Mar. 12, 2013 from corresponding Japanese Patent Application No. 2011-068670 (with English Translation), 6 pages.

* cited by examiner

*Primary Examiner* — Matthew Nguyen
(74) *Attorney, Agent, or Firm* — Ohlandt, Greeley, Ruggiero & Perle, L.L.P.

(57) ABSTRACT

According to one embodiment, a control apparatus communicable with a power measuring apparatus includes a communication unit, a threshold storage, and a controller. The communication unit acquires a usable power value from the power measuring apparatus. The threshold storage stores a threshold value. The controller changes a working state thereof in accordance with a comparison result of the usable power value and the threshold value.

11 Claims, 3 Drawing Sheets

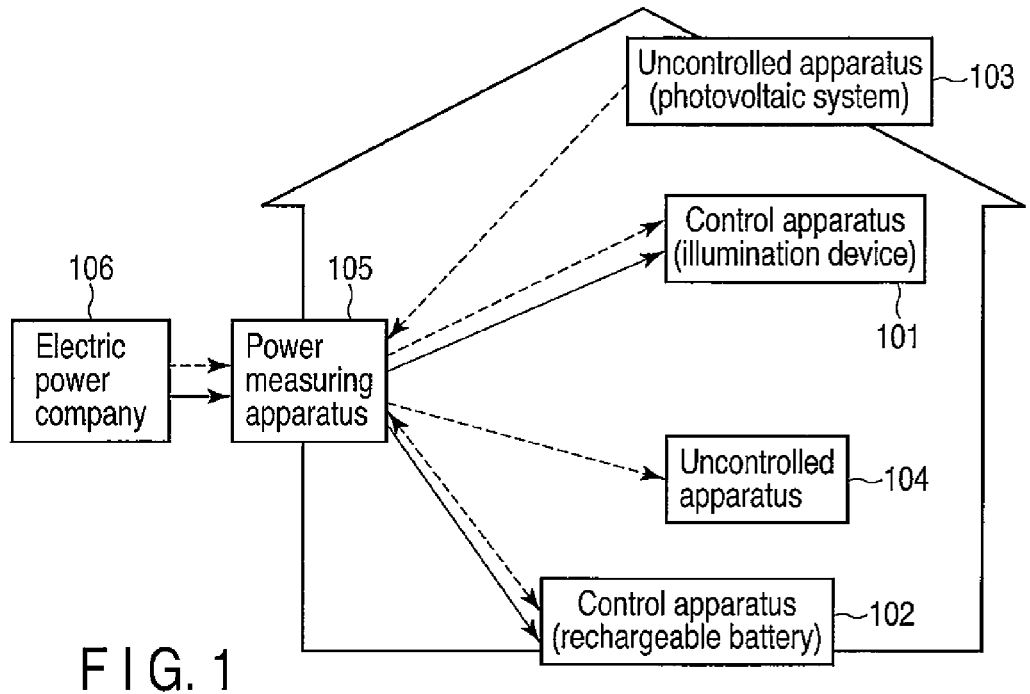
F I G. 1
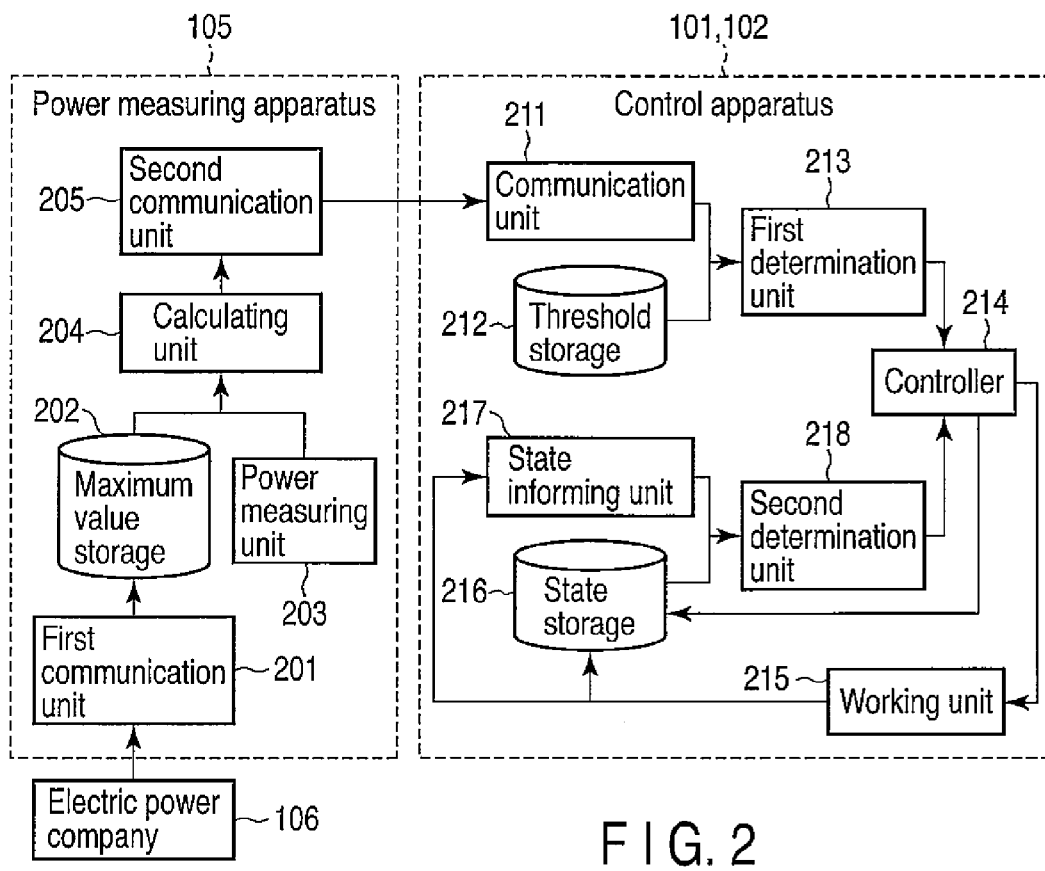
F I G. 2

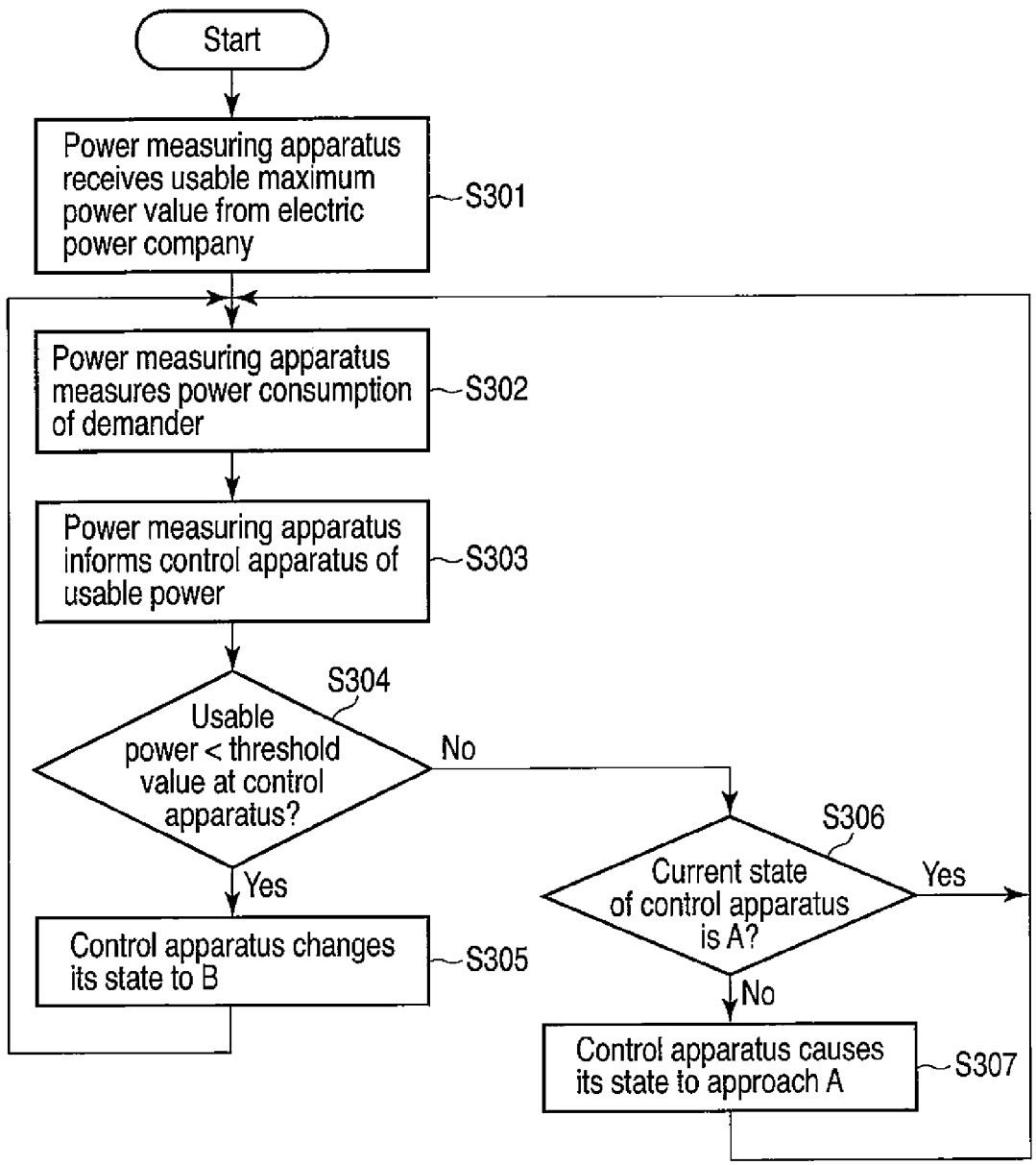
F I G. 3

CONTROL APPARATUS

CROSS-REFERENCE TO RELATED APPLICATIONS

This application is based upon and claims the benefit of priority from prior Japanese Patent Application No. 2011-068670, filed Mar. 25, 2011, the entire contents of which are incorporated herein by reference.

FIELD

Embodiments described herein relate generally to a control apparatus for electric power adjustment.

BACKGROUND

To balance supply and demand of electric power, such a control scheme as so-called a demand response (DR) is known, in which a customer or demander positively responds to a request (demand) for supply/demand adjustment issued from an electric power system.

For a customer with a plurality of home appliances, there is a method of controlling the appliances by communication for the demand response. In this method, an electric power control apparatus with a communication function collects, from an air conditioner, an illumination device, etc., various types of information, such as information indicating the relationship between the operation state and the consumption of power, user set data, and information indicating the current power consumption value, and transmits an operation control signal to each home appliance to respond to a request for supply/demand adjustment upon receiving the request from an electric power system.

In the scheme in which the electric power control apparatus transmits an operation control signal to each home appliance, the electric power control apparatus must exchange a large number of parameters with the home appliances to determine the policy of power adjustment and transmit a control command to the appliances, in order to deal with various combinations of home appliances, or variation in structure due to addition or discard of an appliance. This requires a power control apparatus of high performance and inevitably requires high cost for it.

BRIEF DESCRIPTION OF THE DRAWINGS

FIG. 1 is a schematic view illustrating an outline of a system according to an embodiment;

FIG. 2 is a block diagram illustrating the structures of the power measuring unit and the control apparatus shown in FIG. 1;

FIG. 3 is a flowchart useful in explaining an operation example of the system shown in FIG. 2;

DETAILED DESCRIPTION

Figure 4:
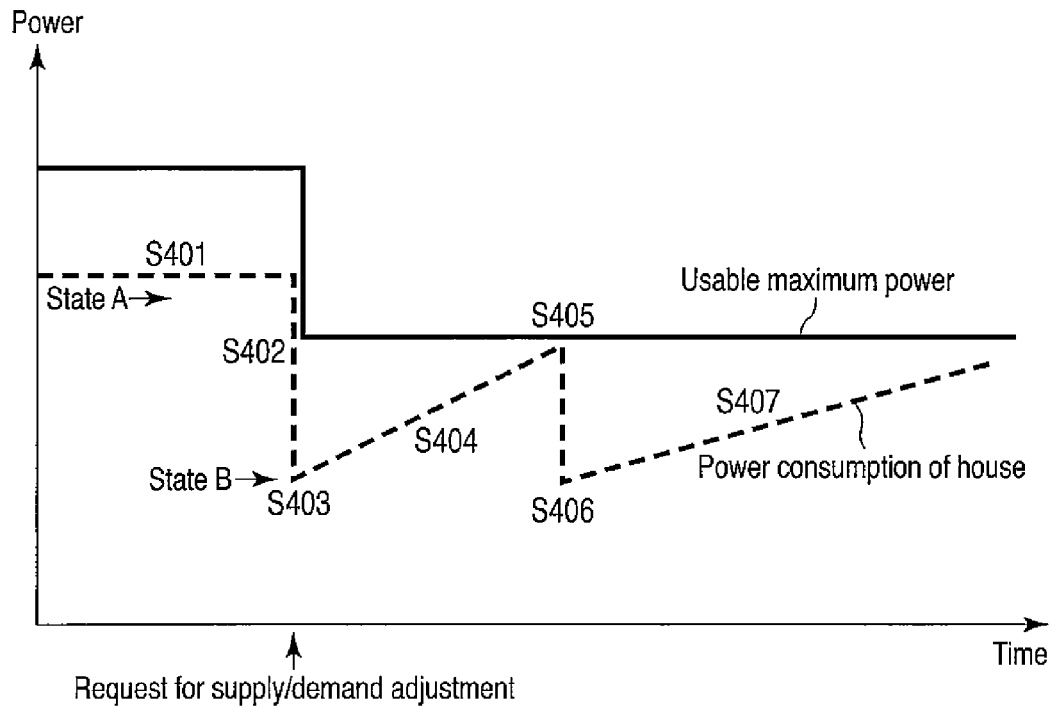
FIG. 4 is a graph illustrating an example of variation in working state and consumed power.

A control apparatus according to an embodiment will be described in detail with reference to the accompanying drawings.

In general, according to one embodiment, a control apparatus communicable with a power measuring apparatus includes a communication unit, a threshold storage, and a controller. The communication unit acquires a usable power value from the power measuring apparatus. The threshold storage stores a threshold value. The controller changes a working state thereof in accordance with a comparison result of the usable power value and the threshold value.

The embodiment provides a control apparatus that enables distributed autonomous control of each home appliance which is free from exchange of a large number of parameters with the control apparatus, and therefore enables power adjustment to be realized regardless of a combination of home appliances or a change in the structure of each home appliance.

Referring first to FIG. 1, a description will be given of an outline of a system incorporating the control apparatus of the embodiment. FIG. 1 is a block diagram illustrating the outline of the system of the embodiment. In the embodiment, the description will be given, using a house as a demander.

As shown in FIG. 1, the system of the embodiment comprises control apparatuses (e.g., 101 and 102), uncontrolled apparatuses (e.g., 103 and 104), a power measuring apparatus 105 and an electric power company 106.

The control apparatuses are discriminated from the uncontrolled apparatuses depending upon whether they have a communication function. Namely, the control apparatuses have a communication function for communicating with the power measuring apparatus 105, while the uncontrolled apparatuses do not have the function. The control apparatuses and the uncontrolled apparatuses include, for example, home appliances (e.g., an air conditioner, an illumination device, etc.) and energy apparatuses (e.g., a photovoltaic device, a rechargeable battery, a fuel cell, etc.) that exist in the house. Multiple control apparatuses and multiple uncontrolled apparatuses may be employed. In FIG. 1, the solid lines indicate flow of communication, and the broken lines indicate the flow of electric power.

The power measuring apparatus 105 will be described later with reference to FIG. 2.

(Example of Application)

As an example of basic application in the system of FIG. 1, there is a case where the electric power company 106 issues a request for supply/demand adjustment to a house provided with a plurality of home appliances and energy apparatuses. In the embodiment, assume that the request for supply/demand adjustment requires placing a limitation on the maximum electric power usable in the house. Assume also that concerning whether the request for supply/demand adjustment should be responded to, and concerning which value should be set as a maximum power usable when the request is responded to, agreement and contract are beforehand made between the electric power company 106 and the demander. Assume further that when the electric power company 106 issues the request for supply/demand adjustment, the contracted demander or house automatically performs change of an air conditioner set temperature, luminance adjustment, discharge of a pre-charged rechargeable battery, etc., in order to reduce the power consumption of the house below the usable maximum power.

(Flow of Electric Power)

The flow of electric power in the embodiment will be described. The electric power from the electric power company 106 is supplied to each of the control apparatuses 101 and 102 and the uncontrolled apparatuses 103 and 104 via the power measuring apparatus 105 (e.g., an electric power meter or a distribution board) of the house. Between the power measuring apparatus 105 and each home appliance, a power transform mechanism, such as a power conditioner, may be interposed. The power receiving and distributing functions of the power measuring apparatus 105 are general functions realized by the existing power meter or distribution board. Therefore, no detailed description will be given thereof.

Since both the control apparatuses 101, 102 and the uncontrolled apparatuses 103, 104 exchange electric power via the power measuring apparatus 105, the power measuring apparatus 105 can calculate the power consumption of the house as the sum of the power values of the control apparatuses 101, 102 and the uncontrolled apparatuses 103, 104 (i.e., as the value obtained by subtracting the generated power values from the consumed power values). Since the measuring function of the power measuring apparatus 105 is a general function realized by, for example, measuring, by the existing power meter, the electric power purchased from the electric power company 106, or realized by measuring the consumption of power by the master breaker in the distribution board, no detailed description will be given thereof.

The working states of the control apparatuses 101, 102 and the uncontrolled apparatuses 103, 104 vary depending on their own judgment or user operations. In accordance with variations in their working states, the consumption of power measured by the power measuring apparatus 105 varies.

(Flow of Communication)

A description will now be given of the flow of communication in the embodiment. The request for supply/demand adjustment sent from the electric power company 106 is received by the power measuring apparatus 105 of the house. The power measuring apparatus 105 communicates with the control apparatuses 101 and 102, which, in turn, perform control for responding to the request. In contrast, the uncontrolled apparatuses 103 and 104, which have no communication function, operate as usual regardless of the issue of the request for supply/demand adjustment. For instance, even during occurrence of the request for supply/demand adjustment, the uncontrolled apparatuses 103 and 104 can start their working by a user operation.

Referring then to FIG. 2, the power measuring apparatus 105 and the control apparatuses 101 and 102 will be described. FIG. 2 is a block diagram useful in explaining the functions of the power measuring apparatus and the control apparatuses.

(Power Measuring Apparatus 105)

As shown in FIG. 2, the power measuring apparatus 105 comprises a first communication unit 201, a maximum value storage 202, a power measuring unit 203, a calculating unit 204 and a second communication unit 205.

The first communication unit 201 receives a request for supply/demand adjustment from the electric power company 106.

The maximum value storage 202 stores data that is contained in the request received by the first communication unit 201, and indicates a usable maximum power. The data indicating the usable maximum power may be stored in the control apparatuses 101 and 102, instead in the power measuring apparatus 105.

The power measuring unit 203 measures the current power consumption of the demander. The power consumption is obtained by subtracting the sum of generated power (discharged power) from the sum of the power consumption of all apparatuses including the control apparatuses 101 and 102 and the uncontrolled apparatuses 103 and 104. Alternatively, the power consumption values of the control apparatuses 101 and 102 may be calculated by themselves and be transferred to the power measuring unit 203.

The calculating unit 204 acquires the value obtained by subtracting the current power consumption value measured by the power measuring unit 203 from the usable maximum power stored in the maximum value storage 202. This value indicates the residual power that can be used by the demander, and will hereinafter be referred to as "usable power."

The second communication unit 205 transmits, to the control apparatuses 101 and 102 via communication, data indicating the usable power obtained by the calculating unit 204.

(Control Apparatuses 101 and 102)

Each of the control apparatuses 101 and 102 comprises a communication unit 211, a threshold storage 212, a first determination unit 213, a controller 214, a working unit 215, a state storage 216, a state informing unit 217 and a second determination unit 218, as is shown in FIG. 2. Since the control apparatuses 101 and 102 have the same structure, only the control apparatus 101 will be further described.

The communication unit 211 receives data indicating the usable power from the second communication unit 205 of the power measuring apparatus 105. The communication unit 211 receives this data at regular-intervals. Each time the communication unit 211 receives the data indicating the usable power, the control apparatus performs predetermined operations as described below. For instance, the threshold storage 212, the first determination unit 213, the controller 214, the working unit 215 and the second determination unit 218 perform the following operations.

The threshold storage 212 stores thresholds set for the respective control apparatuses. The thresholds are compared with the usable power to change the values of power consumed by the control apparatuses, depending on whether each threshold is higher than the usable power. The thresholds will also be described later in Item (Operations of Control Apparatuses 101 and 102).

The first determination unit 213 compares each threshold held in the threshold storage 212 with the usable power data received by the communication unit 211, and informs the controller 214 whether the usable power is less than each threshold.

The controller 214 receives data from the first and second determination units 213 and 218 to instruct the working unit 215 to change the working state of the control apparatus 101. The content of the instruction will be described later in Item (Operations of Control Apparatuses 101 and 102).

The working unit 215 is the mechanical structure itself of the control apparatus 101, and changes the working state of the control apparatus in accordance with the instruction from the controller 214. For instance, the working unit 215 reduces the luminance of the illumination device to a darkest level, or gradually increases the same to a brighter level. Further, the working unit 215 provides the state informing unit 217 with information indicating a state changed in accordance with an instruction from the controller 214.

The state informing unit 217 observes the state of the working unit 215 to detect the current working state of the control apparatus 101, and informs the second determination unit 218 of the detected state of the control apparatus 101. The working state is a state, in accordance with which the consumed power of the control apparatus 101 or the generated power of the control apparatus 102 varies. More specifically, the working state means the set temperature of the air conditioner, the luminance of the illumination device, or charge/discharge of the rechargeable battery. The state informing unit 217 observes the working unit 215 to hold working state information that indicates the working state of the control apparatus 101 assumed at a certain point of time, and provides the information to the second determination unit 218. It will be described later that the working state information obtained at what time is to be held.

When the controller 214 reduces the consumption of power, the state storage 216 stores the working state information obtained immediately before the reduction. When the controller 214 determines that the consumption of power should be reduced, it outputs a trigger signal to the state storage 216 before outputting an instruction to the working unit 215. Upon receiving the trigger signal, the state storage 216 stores the newest one of the working state information items received from the working unit 215. In other words, unless the state storage 216 receives the trigger signal, it does not have to store the working state information received from the working unit 215. The state storage 216 tentatively stores, for example, the newest one of the working state information items received from the working unit 215, and stores the same formally upon receipt of the trigger signal. As a result, the state storage 216 can store the working state information obtained immediately before the reduction of the power consumption.

The state storage 216 may store the working state information in a different way. In this case, the working unit 215 may comprise, for example, a buffer and store the working state information obtained immediately before current state information. Namely, upon receiving an instruction from the controller 214, the working unit 215 may hold working state information corresponding to the instruction received immediately before the currently received one. When the controller 214 determines that the consumption of power should be reduced, it may output a trigger signal to the working unit 215, and cause the working unit 215 to send the working state information stored therein to the state storage 216 upon receiving the trigger signal. Instead of the working unit 215, the state storage 216 may receive the trigger signal, and acquire working state information from the working unit 215 upon receiving the trigger signal.

The second determination unit 218 compares the current working state information, obtained by observation by the state informing unit 217, with the working state information held by the state storage 216, and informs the controller 214 whether they are identical to each other. If they are not identical, the controller 214 instructs the working unit 215 to make its current working state identical to the working state held by the state storage 216.

(Procedure)

Referring now to FIG. 3, the operation of the above-described system will be described. FIG. 3 is a flowchart useful in explaining the operation of the system of the embodiment.

(Operation of Power Measuring Apparatus 105)

Firstly, the operation of the power measuring apparatus 105 will be described with reference to FIG. 3.

If the electric power company 106 determines that supply/demand adjustment needs to be performed, it reports usable maximum power to the house of each demander that assumes and agrees with the company that a demand for supply/demand adjustment is to be responded. In general, this usable maximum power is lower than the maximum power allowed so far. The power measuring apparatus 105 of each house receives information indicative of the usable maximum power via the first communication unit 201, and stores it in the maximum value storage 202 (step S301). Alternatively, the electric power company 106 may transmit only a request for supply/demand adjustment, and the power measuring apparatus 105 may set and store, upon receipt of the request, a usable maximum power predetermined by a pre-existing contract.

The power measuring unit 203 of the power measuring apparatus 105 always measures and holds the power consumption of the entire house (step S302). The calculating unit 204 calculates a usable power value by subtracting the power consumption, obtained by the power measuring unit 203 at step S302, from the usable maximum power value stored in the maximum value storage 202 at step S301, and informs the second communication unit 205 of the power value.

The second communication unit 205 of the power measuring apparatus 105 communicates with the communication unit 211 of each of the control apparatuses 101 and 102 installed in the house, thereby informing the unit 211 of the usable power value (step S303). The power measuring apparatus 105 may periodically broadcast the communication procedure to all control apparatuses 101 and 102, or may individually send it to the control apparatuses 101 and 102. Yet alternatively, each control apparatus 101 or 102 may individually inquire the communication procedure to the power measuring apparatus 105. In this case, the timing or the interval of inquiry may vary between the control apparatuses 101 and 102. Assume that the usable power value informed of from the power measuring apparatus 105 to each control apparatus 101 or 102 always reflects the consumption of power measured by the power measuring unit 203.

(Operations of Control Apparatus 101 and 102)

Referring then to FIG. 3, the operation of each of the control apparatuses 101 and 102 after the usable power value is received will be described.

To facilitate the description, a state A and a state B are defined as the working states of the control apparatus 101 or 102. The state A is defined as the working state of the control apparatus assumed immediately before the issuing of a request for supply/demand adjustment from the electric power company 106. The state B is defined as the working state of the control apparatus in which its power consumption is minimum or close to it. If the control apparatus is an illumination device, the state A corresponds to, for example, a state in which the illumination device is lit, and the state B corresponds to, for example, a state in which the luminance of the illumination device is lowest. Further, if the control apparatus is an air conditioner, the state A corresponds to, for example, a state in which it is operating at a temperature set by a user via a remote controller, and the state B corresponds to, for example, a state in which the set temperature is set equal to room temperature. If a user operation is performed after the issuing of a request for supply/demand adjustment, the state A may be reset as the state assumed after the user operation. Further, the state B is assumed to be set to respective levels for the control apparatuses and be beforehand informed of to the control apparatuses.

When the communication unit 211 of the control apparatus has received data on the usable power from the power measuring unit 105, the first determination unit 213 compares the received data with a threshold value individually held in the threshold storage 212 of the control apparatus (step S304). If the usable power is less than the threshold value, the controller 214 instructs the working unit 215 to change the working state of the control apparatus to the state B (step S305). If the usable power is not less than the threshold value, the second determination unit 218 compares the state-A information stored in the state storage 216 with current working state information sent from the state informing unit 217, thereby determining whether they are identical to each other (step S306). If they are identical to each other, nothing is performed, while if they are not identical, the controller 214 issues an instruction to gradually return the control apparatus to the state A as the original working state (step S307). Various ways may be employed to cause the control apparatus to approach the state A. However, if the working state of the control apparatus is reset to a state lower than the state B (by, for example, power off), the control apparatus is immediately shifted to the reset state.

(Congestion Control)

At steps S304 to S307 of FIG. 3, the consumption of power of each control apparatus 101 or 102 is adjusted like congestion control of TCP. Referring now to FIG. 4, changes in working state and consumption of power will be described.

For facilitating the description, an example where the power consumption of each uncontrolled apparatus is always 0, only one control apparatus is employed, and the threshold value held by this control apparatus is 0 will be described. In this case, the power consumption of the entire house is equal to that of the control apparatus. Changes in illumination are assumed as examples of changes in the working state of the control apparatus.

Firstly, assume that the control apparatus works in the state A (step S401). At this time, since the power consumption of the house is smaller than the usable maximum power, the usable power is more than 0. In this case, the control apparatus is maintained in the state A, and performs nothing. For instance, if the illumination is set maximum by a user, this state is maintained.

Assume then that the electric power company 106 has issued a request for supply/demand adjustment, thereby reducing the usable maximum power (step S402). At this time, since the power consumption of the house is larger than the usable maximum power, the usable power is less than 0. In this case, the control apparatus changes its working state to the state B. Namely, the power consumption of the control apparatus is reduced (step S403). For instance, the luminance of the illumination device is set to the lowest.

In the state B, the power consumption of the house is less than the usable maximum power, and hence the usable power is more than 0. In this case, the control apparatus gradually changes its state so that it returns to the state A as the original working state. Since the state A is greater in power consumption than the state B, the power consumption of the control apparatus is gradually increased (step S404). For instance, the luminance of the illumination device is gradually increased.

When the usable power becomes less than 0 as a result of gradual increases in the power consumption of the control apparatus (step S405), the control apparatus again changes its own state to the state B (step S406). After that, the same process as the above is iterated until the control apparatus returns to the state A (step S407).

If the threshold value is greater than 0, the change to the state B at steps S405 and S406 in FIG. 4 is realized in an earlier stage. Namely, before the power consumption of the house reaches the usable maximum power, the power consumption of the control apparatus is reduced to thereby reduce the power consumption of the house.

The threshold value, the degree of change of the working state (the slope of increase of power consumption at step S404 or S407), the state B, etc., may be fixed values set for the type or form of the control apparatus at the time of shipping, or may be set or adjusted by a user using external setting means (not shown) attached to the control apparatus, or may be automatically set by the control apparatus itself.

Regarding how to set those values, the same idea as each congestion control scheme in TCP is applicable. In TCP congestion control, if no congestion occurs and no packet is lost, it is considered that the network band has an allowance, thereby increasing the window size (packet transmission rate) to increase the rate of transfer. In contrast, if congestion has occurred and a packet is lost, the window size is reduced to reduce the rate of transfer, thereby eliminating congestion.

Regarding to what degree the window size is to be reduced upon occurrence of congestion, and how the window size is increased after the reduction, various adjusting schemes or methods have been proposed and realized. Assuming that changes in transfer rate in the TCP congestion control corresponds to changes in the power consumption in the embodiment, steps S405, S406 and S407 shown in FIG. 4 can be regarded as, for example, the occurrence of congestion, the reduction of the window size after the occurrence of congestion, and the increase of the window size thereafter, respectively.

Even if the uncontrolled apparatus is operating or starts to operate on the way to thereby increase the power consumption of the house, the control apparatus automatically reduces its own power consumption by the same control scheme as that shown in FIGS. 3 and 4. Thus, the power consumption of the house is controlled so as not to exceed the usable maximum power.

(Multiple Control Apparatuses including a Power Generating Apparatus)

A description will be given of a case where a plurality of control apparatuses 101 and 102 including a control apparatus with a power generating function exist in a house. Each of the control apparatuses 101 and 102 operates in accordance with the flowchart shown in FIG. 3.

(Power Generating Apparatus)

In a control apparatus with a power generating function, the state B is defined as a state in which the apparatus is generating its maximum electric power. For instance, in the case of an already charged rechargeable battery, the state A is a state in which no discharge is performed, and the state B is a state in which the rechargeable battery discharges its maximum electric power.

Figure 5:
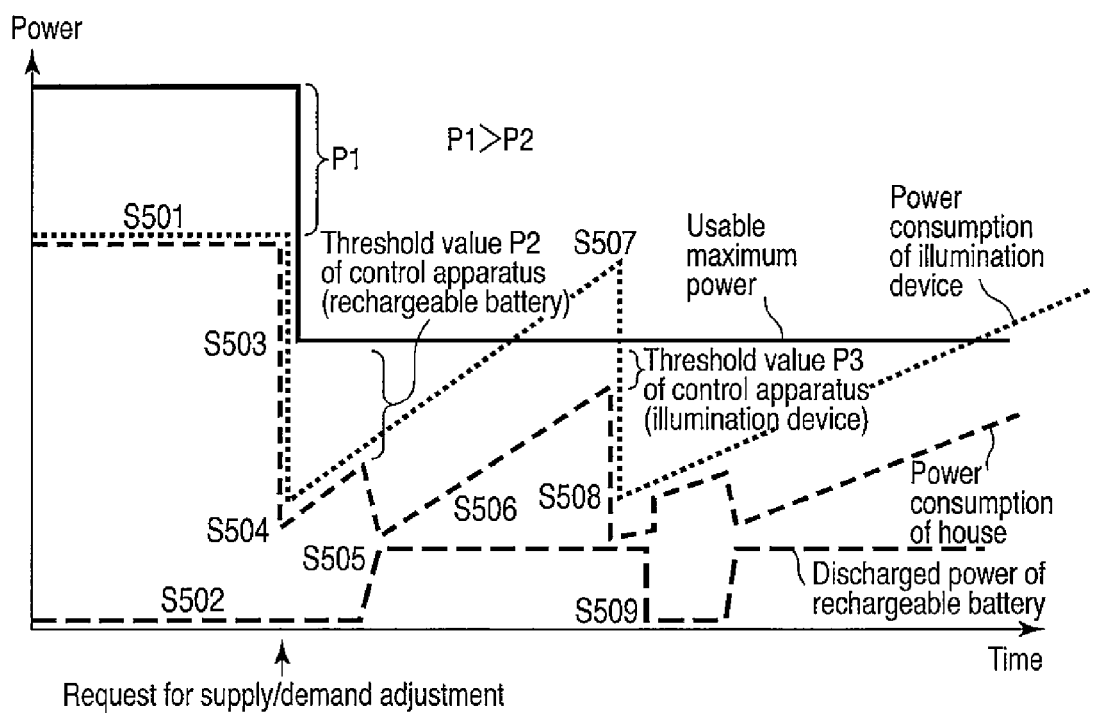
FIG. 5 is a graph illustrating an example of variation in working state and consumed power assumed when there is a control apparatus having a power generating function.

Referring to FIG. 5, a description will be given of how the consumed power and working state of an illumination device as a control apparatus and an already charged rechargeable battery vary when a request for supply/demand adjustment is issued, and of how the consumed power (i.e., the value obtained by subtracting the discharged power of the rechargeable battery from the consumed power of the illumination device) of the whole house varies.

Firstly, assume that the illumination device is lit (step S501), and the rechargeable battery is in the state A (i.e., it is not discharged) (step S502). At this time, the consumed power of the house is equal to that of the illumination device.

Assume here that the electric power company 106 has issued a request for supply/demand adjustment and therefore the usable maximum power is reduced (step S503). The illumination device and the rechargeable battery detect the reduction at their respective times. Assume here that the illumination device responds to the reduction and operates to reduce its own consumption of power earlier (step S504). As a result, the consumed power of the house becomes smaller than the usable maximum power.

After that, the illumination device gradually increases its consumption of power, as in the case of FIG. 4. The illumination device and the rechargeable battery constantly monitor whether the usable power becomes less than the threshold values held by themselves. Assume here that a threshold value $P_2$ held by the rechargeable battery is higher than a threshold value $P_3$ held by the illumination device. Accordingly, when the usable power becomes less than the threshold value held by the rechargeable battery, the rechargeable battery shifts to the state B, i.e., the discharge state (step S505).

Since the rechargeable battery performs discharge, the consumed power of the house is once reduced. However, the illumination device continues increasing its consumption of power, and hence the consumed power of the house again increases (step S506). When the usable power becomes less than the threshold value of the illumination device (step S507), the illumination device reduces its consumption of power (step S508).

When the consumed power of the illumination device reduces, the consumed power of the house reduces accordingly, whereby the usable power becomes greater than the threshold value held by the rechargeable battery. As a result, the rechargeable battery shifts to the state A, where it stops discharge (step S509).

Thereafter, the same procedure as the above, in which when the consumed power of the illumination device is again increased, the rechargeable battery again performs discharge, is repeated.

Although in the example of FIG. 5, the illumination device and the rechargeable battery operate individually, the power consumption of the house is controlled not to exceed the usable maximum power. Further, such a rough ordering of priority, as in which, for example, discharge of the rechargeable battery is performed in many cases in preference to adjustment of the power consumption of the illumination device, can be realized using the difference between the threshold values.

In the above-described at least one embodiment, since each control apparatus has a function of automatically reducing its own power consumption, the power consumption of the whole house can be prevented from exceeding the usable maximum power. Thus, each control apparatus of the embodiment enables distributed autonomous control of each home appliance, which is free from exchange of a large number of parameters between home appliances and each control apparatus, and therefore enables power adjustment to be realized regardless of a combination of home appliances or a change in the structure of each home appliance.

The flow charts of the embodiment illustrate methods and systems according to the embodiment. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control apparatus communicable with a power measuring apparatus which measures a consumed power value, the control apparatus comprising:
   a communication unit configured to acquire information from the power measuring apparatus; and
   a controller configured to control a working state thereof,
   wherein if the information acquired by the communication unit satisfies a predetermined condition, the controller changes the working state to once reduce a consumed power thereof, and then to gradually increase the consumed power.

2. The apparatus according to claim 1, wherein the communication unit acquires the information regarding a usable power value, and the controller makes a decision as to whether or not the information satisfies the predetermined condition in response to comparison of a predetermined threshold value with the information regarding the usable power value.

3. The apparatus according to claim 2, wherein if the control apparatus has a power generating function or power discharge function and if the usable power value is less than the threshold value, the control apparatus changes the working state to increase a generated power thereof or a discharged power thereof.

4. The apparatus according to claim 1, wherein when the communication unit acquires new information during a time that the controller changes the working state to gradually increase the consumed power and if the new information satisfies the predetermined condition, the controller reduces the consumed power thereof less than a present consumed power at the time.

5. The apparatus according to claim 1, wherein the control apparatus is an air conditioner.

6. A control method using a control apparatus communicable with a power measuring apparatus which measures a consumed power value, the method comprising:
   acquiring information from the power measuring apparatus; and
   controlling a working state of the control apparatus,
   wherein if the acquired information satisfies a predetermined condition the controlling the working state changes the working state to once reduce a consumed power of the control apparatus and then to gradually increase the consumed power.

7. The method according to claim 6, further comprising changing the working state to increase a generated power or a discharged power of the control apparatus, if the control apparatus has a power generating function or a discharge function and if the acquired information satisfies a predetermined condition.

8. A non-transitory computer readable medium encoded with computer executable instructions, wherein the instructions, when executed by a processor, cause the processor to execute a method using a control apparatus communicable with a power measuring apparatus which measures a consumed power value, the method comprising:
   acquiring information from the power measuring apparatus; and
   controlling a working state of the control apparatus,
   wherein if the acquired information satisfies a predetermined condition, the controlling the working state changes the working state to once reduce a consumed power of the control apparatus and then to gradually increase the consumed power.

9. The computer readable medium according to claim 8, further comprising changing the working state to increase a generated power or a discharged power of the control apparatus, if the control apparatus has a power generating function or a discharge function and if the acquired information satisfies a predetermined condition.

10. A control apparatus communicable with a power measuring apparatus which measures a consumed power value, the control apparatus comprising:
   means for acquiring information from the power measuring apparatus; and
   means for controlling a working state of the control apparatus,
   wherein if the acquired information satisfies a predetermined condition, the controlling means changes the working state to once reduce a consumed power of the control apparatus and then to gradually increase the consumed power.

11. The apparatus according to claim 10, wherein if the control apparatus has a power generating function or a power discharge function and if the acquired information satisfies a predetermined condition, the control apparatus changes the working state to increase a generated power of the control apparatus or a discharged power of the control apparatus.

* * * * *